US012812571B2

(12) United States Patent
Bamidi et al.

(10) Patent No.: US 12,812,571 B2
(45) Date of Patent: Nov. 24, 2026

(54) RADIO DEVICE SYNCHRONIZATION

(71) Applicant: Nordic Semiconductor ASA, Trondheim (NO)

(72) Inventors: Ravi Kiran Bamidi, Trondheim (NO); Pål Håland, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 289 days.

(21) Appl. No.: 18/428,503

(22) Filed: Jan. 31, 2024

(65) Prior Publication Data

US 2024/0397455 A1 Nov. 28, 2024

(30) Foreign Application Priority Data

Feb. 1, 2023 (GB) .................................... 2301471

(51) Int. Cl.
*H04W 56/00* (2009.01)
*H04W 12/037* (2021.01)
*H04W 12/041* (2021.01)
*H04W 48/10* (2009.01)

(52) U.S. Cl.
CPC ....... *H04W 56/001* (2013.01); *H04W 12/037* (2021.01); *H04W 12/041* (2021.01); *H04W 48/10* (2013.01)

(58) Field of Classification Search
CPC ............ H04W 56/001; H04W 12/037; H04W 12/041; H04W 48/10
See application file for complete search history.

(56) References Cited

U.S. PATENT DOCUMENTS

| | | | | |
|---|---|---|---|---|
| 10,009,736 | B1 * | 6/2018 | Chu | H04W 12/03 |
| 10,609,581 | B2 * | 3/2020 | Lee | H04W 12/08 |
| 2007/0223431 | A1 * | 9/2007 | Jaakkola | H04W 48/20 370/338 |
| 2008/0151868 | A1 * | 6/2008 | Kezys | H04L 12/4641 370/352 |
| 2017/0012977 | A1 * | 1/2017 | Li | H04L 63/06 |
| 2020/0084697 | A1 * | 3/2020 | Sridhara | H04B 7/15592 |
| 2021/0297853 | A1 * | 9/2021 | Lee | H04W 12/03 |
| 2022/0330181 | A1 | 10/2022 | Kolding et al. | |

(Continued)

FOREIGN PATENT DOCUMENTS

WO WO-2022246838 A1 * 12/2022 ........... H04W 4/024

OTHER PUBLICATIONS

Englsih translation for WO_2022246838_A1_Gao (Year: 2022).*

(Continued)

*Primary Examiner* — Sujoy K Kundu
*Assistant Examiner* — Weibin Huang
(74) *Attorney, Agent, or Firm* — Klarquist Sparkman, LLP

(57) ABSTRACT

A method of synchronizing a plurality of client devices with an access point device comprises broadcasting by radio, from the access point, an encrypted broadcast message comprising synchronization information. The method further comprises receiving the encrypted broadcast message at each of the plurality of client devices, decrypting the encrypted broadcast message at each client device of the plurality of client devices, and using the synchronization information at each client device to synchronize the respective client device with the access point device.

17 Claims, 2 Drawing Sheets

(56) References Cited

U.S. PATENT DOCUMENTS

2024/0236887 A1* 7/2024 Liu .................. H04W 56/0015

OTHER PUBLICATIONS

Bluetooth® Low Energy Controller, Specification of the Bluetooth® System, vol. 6, Covered Core Package Version: 5.3, Revision Date: Jul. 13, 2021, 422 pages.
Enhancing Bluetooth® Technology, Specifications in Development, downloaded from https://www.bluetooth.com/specifications/specifications-in-development/ on Jan. 18, 2023, 3 pages.
IPO Combined Search and Examination Report under Sections 17 and 18(3) for Great Britain Application No. 2301471.5, mailed Jul. 28, 2023, 6 pages.

* cited by examiner

RADIO DEVICE SYNCHRONIZATION

CROSS REFERENCE TO RELATED APPLICATION

This application claims priority from Great Britain Application No. 2301471.5, filed Feb. 1, 2023, which application is incorporated herein by reference in its entirety.

TECHNICAL FIELD

This invention relates to methods, devices and systems for synchronizing client devices, by radio, with an access point device.

BACKGROUND

Some radio communication protocols involve a first radio device advertising its presence to other nearby radio devices by broadcasting so-called advertising packets. For example, a client device may periodically broadcast advertising packets to a wireless access point (AP) in range. The wireless access point (AP) can detect these packets and, if desired, respond to establish a connection with the client device for two-way data transfer.

One example of a radio communication standard that uses advertising packets is Bluetooth™ Low Energy (BLE). Some versions of BLE may also support a Periodic Advertising with Response (PAwR) operating mode, in which a device that receives a periodic advertisement can transmit a response back. This should help support efficient communication amongst a large number of BLE devices within a single system. It may be particularly useful for Electronic Shelf Label (ESL) systems that may contain thousands of ESL devices.

Synchronization between devices can be important in radio systems that contain multiple devices, as it can enable power savings by allowing devices to enter a low-power sleep state whenever they are not actively receiving or transmitting radio packets. In some systems, once client devices have established a connection to an access point, each client device can be synchronized to transmissions from the access point to allow efficient two-way communication between the client device and the access point. While synchronized, each client device can send data to, and receive data from the access point according to shared timing information. This timing information may be transmitted from the access point to devices in range over a radio connection.

However, it is possible for client devices that are synchronized with an access point to lose synchronization, e.g. due to a temporary loss of power. After synchronization between a client device and the access point is lost, the unsynchronized client device must re-establish synchronization before efficient communication can resume according to shared timing information.

Synchronizing client devices can impose a significant overhead on the access point, especially if there may be many client devices requiring resynchronization at the same time.

It can also be important that any synchronization process is implemented securely, e.g. to avoid a client device being tricked into synchronizing with an imposter access point that is being operated by a malicious agent.

The present invention seeks to provide an efficient approach for securely synchronizing client devices with an access point.

SUMMARY OF THE INVENTION

According to a first aspect of the present invention there is provided a method of synchronizing a plurality of client devices with an access point device, the method comprising:

broadcasting by radio, from the access point device, an encrypted broadcast message comprising synchronization information;

receiving the encrypted broadcast message at each of the plurality of client devices;

decrypting the encrypted broadcast message at each client device of the plurality of client devices; and using the synchronization information at each client device of the plurality of client devices to synchronize the respective client device with the access point device.

According to a second aspect of the invention there is provided a radio communication system comprising:

a plurality of client devices; and an access point device configured to communicate with the plurality of client devices;

wherein the access point device is configured to broadcast by radio an encrypted broadcast message to the plurality of client devices, wherein the encrypted broadcast message comprises synchronization information; and wherein each of the client devices is configured to:

receive the encrypted broadcast message;

decrypt the encrypted broadcast message; and use the synchronization information to synchronize the respective client device with the access point device.

According to a third aspect of the invention there is provided an access point device configured to:

broadcast by radio an encrypted broadcast message to a plurality of client devices, wherein the encrypted broadcast message comprises synchronization information for the plurality of client devices; and receive data from one or more of the plurality of client devices by radio at a time determined at least in part by the synchronization information.

According to a fourth aspect of the invention there is provided a client device configured to:

receive by radio an encrypted broadcast message broadcast from an access point device to a plurality of client devices, the encrypted broadcast message comprising synchronization information for the plurality of client devices;

decrypt the encrypted broadcast message; and use the synchronization information to synchronize with the access point device.

Thus, it will be appreciated by those skilled in the art that, in embodiments of these aspects, by broadcasting synchronization information in an encrypted message that can be received and decrypted by a plurality of client devices, multiple devices can be efficiently synchronized without requiring the access point to transmit different messages to each client device individually to provide each client device with synchronization information. This may be particularly beneficial in systems where the access point may be communicating with a large number (e.g. thousands or tens of thousands) of client devices. In such systems, if even a small percentage of client devices lose synchronization with the access point, then at any given time tens or hundreds of client devices may need to be re-synchronized. A naïve approach that requires the access point to connect to each of the devices that has lost synchronization individually would be time-consuming and resource inefficient for both the unsynchronized client devices and the access point. By broadcasting synchronization information to multiple devices simultaneously, these individual synchronization operations can be avoided. In addition, the access point does not necessarily need to monitor the synchronization status of individual client devices, improving the overall performance of the access point.

The same synchronization information in the broadcast message is preferably suitable for synchronizing each of the plurality of client devices—i.e. the same synchronization information is preferably used by each of the client devices, rather than the broadcast message including different synchronization information for respective client devices. The synchronization information may comprise information about the timing of one or more future transmissions by the access point. This may enable the client devices to save power by deactivating their radio receivers when no transmission is scheduled.

In some embodiments, the access point device may broadcast the synchronization information as an advertising message. The access point device may broadcast the synchronization information in a message that conforms to a current or future version of the Bluetooth™ Low Energy (BLE) specification. It may broadcast the synchronization information in a BLE advertising packet, which may be a periodic advertising packet. However, it will be appreciated that embodiments are not limited to the use of BLE, and the method may equally be applied to other radio communication protocols in some embodiments.

The access point may be configured to broadcast synchronization information periodically, e.g. as periodic advertising messages. It may broadcast respective synchronization information in a train of BLE periodic advertising packets. The synchronization information that is broadcast in successive messages may remain the same, at least for a plurality of messages, or it may change in each successive message.

In some embodiments, the client devices may be electronic shelf labels (ESLs). Each may comprise a display screen. One or more of the client devices may comprise one or more environmental sensors, such as a temperature sensor for measuring a temperature adjacent the client device, a humidity sensor for measuring a humidity level in the air surrounding the client device, a pressure sensor for measuring the atmospheric pressure around the client device or a light sensor for measuring the level of ambient light in the in the environment in which the client device is situated. The client devices and the access point device may implement an Electronic Shelf Label (ESL) radio protocol, such as the Bluetooth™ Low Energy (BLE) ESL profile. The client devices may be BLE Electronic Shelf Label (ESL) devices (e.g. ESL tags) in some embodiments. The access point and the client devices may be configured to communicate using a Periodic Advertising with Responses (PAwR) protocol of a Bluetooth™ Low Energy standard. The access point may thus broadcast the synchronization information in an advertising packet conforming to a BLE Periodic Advertising with Responses protocol.

In some embodiments, the encrypted broadcast message comprising the synchronization information is sent in the ACAD field of a BLE AUX_ADV_IND packet broadcast by the access point. This allows efficient repurposing of a message that may also be used for other purposes.

Any of the operations disclosed herein may be implemented in hardware or software. In some embodiments, the access point and/or each client device may comprise a processor and a memory storing instructions to be executed by the processor for performing some or all of the operations disclosed herein. The memory of each client device may store a cryptographic key for decrypting the encrypted broadcast message comprising synchronization information broadcast by the access point. The same cryptographic key may be stored in the memory of each of the plurality of client devices. The cryptographic key stored in the memory of each client device may be a symmetric key that is also used (e.g. by the access point) in the encryption of the broadcast message comprising synchronization information. However, it is possible that in some embodiments the broadcast message may be encrypted using a public key of a public-private key pair and the client devices may all store a shared private key of the public-private key pair for decrypting the broadcast message.

In some embodiments, the synchronization information broadcast by the access point may be encrypted by the access point, for example using a processor and/or cryptographic hardware of the access point. It may be encrypted according to the Bluetooth™ Encrypted Advertising Data format, e.g. using AES-CCM with a 128-bit key. This may be particularly beneficial in cases where the client devices and the access point implement a BLE Electronic Shelf Label (ESL) profile specification, as the Encrypted Advertising Data format may also be used to exchange commands and responses between the access point and the ESL devices, and hence additional encryption methods are not required.

Each client device may be configured to establish a connection with the access point prior to synchronization. Establishing a connection between a client device and the access point may comprise the client device transmitting an advertising message requesting connection with the access point. It may comprise the access point authenticating the client device and/or the client device authenticating the access point. Authenticating the access point may comprise the access point transmitting an authentication message, encrypted using a cryptographic key, to a client device, and the client device decrypting the received message using a cryptographic key stored in a memory of the client device.

In some embodiments, the method may further comprise an initial configuration process for each client device, in which a client device receives configuration data from the access point. The configuration process may comprise the access point transmitting a message by radio to the client device comprising the configuration data. The message may be addressed only to the client device. The configuration data may include a response address, which the client device may be configured to store in a memory of the client device and to include in one or more messages sent subsequently by the client device to the access point. The response address may be client-specific and/or connection-specific and/or session-specific. The configuration data may specify a time interval for the client device to wait before synchronizing with the access point using a broadcast message. This may improve efficiency when the access point has to configure a large number of client devices and so cannot immediately start broadcasting synchronization information until they have all been configured. The initial configuration process may be performed for a client device before that client device synchronizes with the access point device.

Each client device may be configured to authenticate the broadcast message. This authentication may be separate (i.e. independent) from decrypting the broadcast message, or it may involve the same operation—e.g. such that successful authentication implies successful decryption of the encrypted broadcast message.

In some embodiments, the encrypted broadcast message comprising synchronization information may be decrypted at each of the client devices using a common (i.e. shared across the plurality of client devices) second cryptographic key generated by each client device using a common first cryptographic key stored in a memory of each client device. The first cryptographic key may be used by the client devices for decrypting other encrypted messages received by a client device from the access point that are not the broadcast messages that include the synchronization information for all of the plurality of client devices. The encrypted broadcast message comprising synchronization information may thus be encrypted with a second cryptographic key generated from the first cryptographic key used for decrypting other messages received by the client devices. This may improve security by ensuring that the encrypted broadcast messages appear very different from messages encrypted using the first cryptographic key and so cannot easily be decrypted by an attacker. However, in some embodiments the synchronization information may be encrypted using the first cryptographic key itself, or may be encrypted using an unrelated key.

The second cryptographic key may be generated from the first cryptographic key using a key derivation function (KDF), such as a National Institute of Standards and Technology (NIST) compliant key derivation function. In some embodiments, the key derivation function may be an Advanced Encryption Standard Cipher-based Message Authentication Code (AES-CMAC) based key derivation function.

The second cryptographic key may be generated locally at each of the client devices in some embodiments, e.g., using a processor of each client device configured execute software to generate the second key using a key derivation function. In some embodiments however, the second cryptographic key may be preloaded in a memory of the client device, e.g. the second cryptographic key may be provided to the client devices during an initialisation or deployment phase.

In some embodiments, the access point is configured to broadcast the encrypted broadcast message comprising synchronization information periodically. The access point may thus be configured to broadcast the encrypted broadcast message at intervals to allow the client devices to be synchronized (including resynchronized when required) in a timely manner. Some of the broadcast messages may be received and used by no client devices for synchronization, or only by one client device. However, each is suitable for resynchronizing a plurality of client devices, if this is required.

The plurality of client devices may include all client devices of the system that are configured to communicate with the access point, or may be only a subset (e.g. a group) of all the client devices of the system. In some embodiments, a set of client devices of the system may be divided among a plurality of groups, and the access point may be configured to broadcast a plurality of encrypted broadcast messages, wherein each of the broadcast messages comprises synchronization information specific to one of the plurality of groups. In this way, groups of devices can be synchronized with the access point with different synchronization information, e.g. timing information for responding to the access point. Each of the plurality of encrypted broadcast messages may be encrypted using a different cryptographic key, e.g. such that the client devices of each group use a respective group-specific cryptographic key to decrypt the encrypted broadcast message comprising synchronization information for the group. This may improve security and/or help to ensure that the correct synchronization information is received by each client device. When different cryptographic keys are used for each group, each group-specific cryptographic key may be generated using (i.e. derived from) a first cryptographic key stored in a memory of each client device of the group. The first cryptographic keys may be specific to each group and/or a group-specific process may be used to generate the group-specific cryptographic key from the first cryptographic key. For example, all of the client devices in a first group may generate a cryptographic key using a first key derivation function stored in the memory of the client devices of the first group, while all of the client devices in a second group may generate a cryptographic key using a second key derivation function, stored in the memory of the client devices of the second group. The access point may be configured to store a respective key generation function for each group of client devices in a memory of the access point. In some embodiments however, the same key generation function may be used for all groups, and one or more of the inputs to the key generation function may be group-specific. For example, all of the client devices in a first group may generate a cryptographic key using an ID associated with the first group as an input to a key derivation function stored in the memory of all client devices, while all of the client devices in a second group may generate a cryptographic key using an ID associated with the second group as an input to a key derivation function, stored in the memory of all of the client devices. In such embodiments, the access point may be configured to store a plurality of IDs (e.g. one ID per group of client devices) for input to a key generation function identical to that stored in the memory of all client devices.

Features of any aspect or embodiment described herein may, wherever appropriate, be applied to any other aspect or embodiment described herein. Where reference is made to different embodiments, it should be understood that these are not necessarily distinct but may overlap. It will be appreciated that all of the preferred features of the method according to the first aspect described above may also apply to the other aspects of the invention.

BRIEF DESCRIPTION OF THE DRAWINGS

One or more non-limiting examples will now be described, by way of example only, and with reference to the accompanying figures in which.

DETAILED DESCRIPTION

Figure 1:
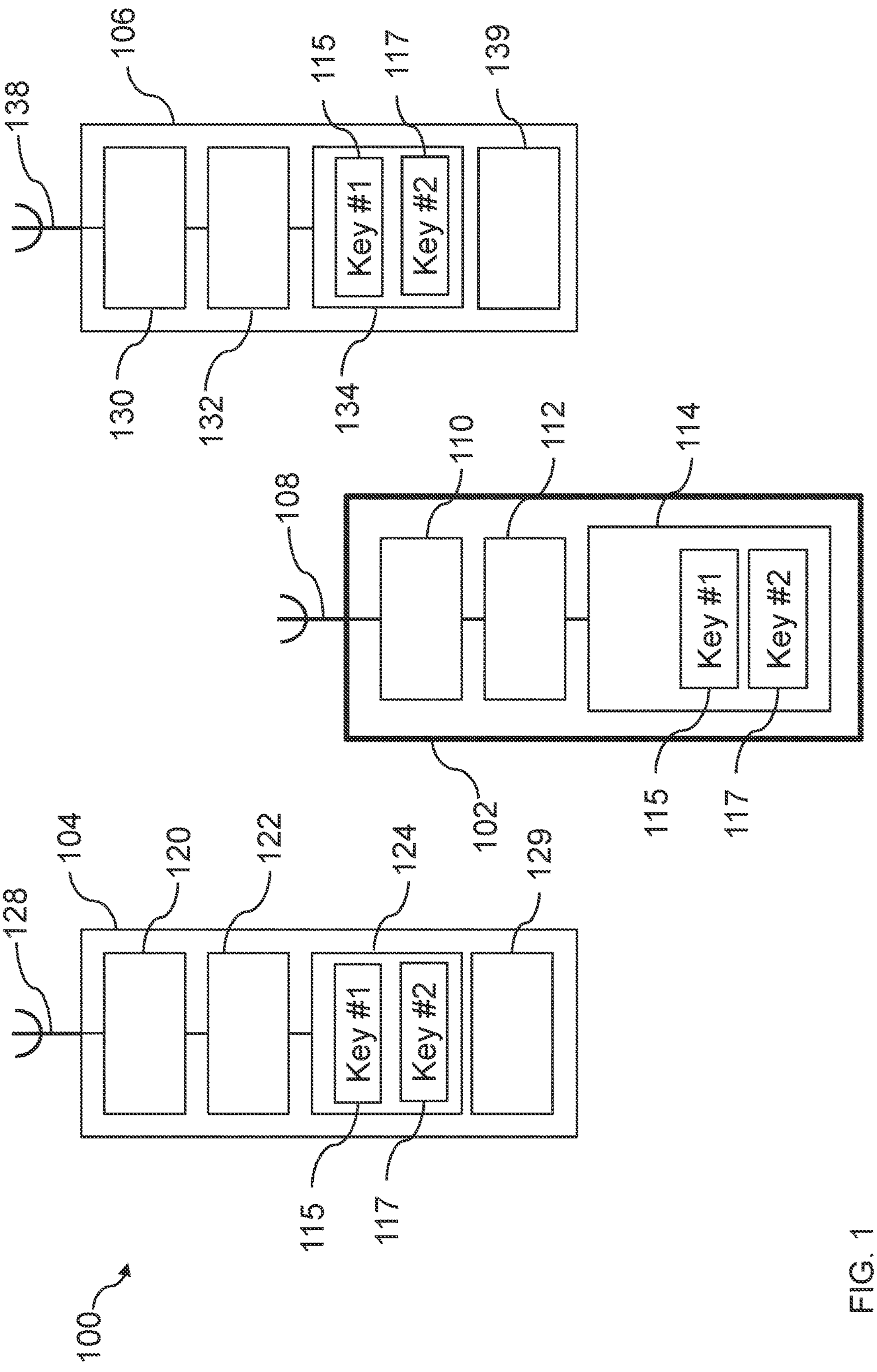
FIG. 1 shows a radio communication system according to an embodiment of the present invention.

FIG. 1 shows a radio communication system 100 comprising a first radio transceiver device 102, a second radio transceiver device 104, and a third radio transceiver device 106. The first radio transceiver device 102 is an access point (AP) (i.e. a central device) configured to broadcast advertising packets. The second and third radio transceiver devices 104, 106 (also referred to herein as client devices) are configured to exchange radio packets with the access point 102.

The client devices 104, 106 may, in some embodiments, be electronic shelf label (ESL) tags. They may be attached to shelves or products in a shop or warehouse. They may have display screens, e.g. for displaying product price information, and thermometers, e.g. for measuring the temperature of an environment around the ESL. They may be arranged to receive information to display from the access point 102 and to transmit temperature information to the access point 102.

In some embodiments, the access point 102 and client devices 104, 106 may be configured to communicate with each other in accordance with a current or future version of the Bluetooth™ Low Energy (BLE) specification.

Although only two ESL tags 104, 106 are shown in FIG. 1 for simplicity of illustration, the access point 102 may be configured to operate with a significantly larger number of client devices in practice, e.g., thousands or tens of thousands of devices. In a preferred embodiment, the access point 102 is configured to operate with up to 32,000 devices.

The access point 102 comprises an antenna 108, a front-end portion 110, a processor 112 and a memory 114. The processor 112 executes software stored in the memory 114 to provide data to the front-end portion 110 for broadcast via the antenna 108. The antenna 108 is also configured to detect RF signals from the ESL tags 104, 106, and forward these to the front-end portion 110, which handles analogue reception processes such as demodulation, demultiplexing and sampling. The front-end portion 110 may comprise one or more ADCs, mixers, filters, amplifiers and/or baluns.

The second and third radio transceiver devices, i.e. the ESL tags 104, 106, also similarly comprise respective antennas 128, 138, front-end portions 120, 130, processors 122, 132 and memories 124, 134. They may also each have a display screen 129, 139.

The access point 102 is configured to operate with the ESL tags 104, 106 according to an Electronic Shelf Label profile specification of a Bluetooth™ Low Energy protocol to allow for two-way data transfer between the ESL tags 104, 106 and the access point 102. Specifically, the ESL tags 104, 106 communicate with the access point 102 using a Periodic Advertising with Responses (PAwR) protocol, which requires that the ESL tags 104, 106 are synchronized to periodic advertising messages transmitted by the access point 102.

In order for two-way communication between the ESL tags 104, 106 and the access point 102 to take place, each ESL tag 104, 106 needs to connect to the access point 102 to obtain synchronization information from the access point 102 and to synchronize with the access point 102 so as to communicate using appropriate timing information.

Synchronization of the ESL tags 104, 106 with the access point 102 allows the ESL tags 104, 106 to enter a standby state, and to wake and listen for periodic advertising messages broadcast by the access point 102 for a short time window each time the advertising messages are broadcast. The ESL tags 104, 106 can therefore to remain in a standby state at other times, allowing the power consumption of the ESL tags 104, 106 to be minimised. The ESL tags 104, 106 synchronize with the access point 102 based on timing information received from the access point 102 and stored in a memory the ESL tags 104, 106.

In a naïve approach, synchronization between an unsynchronized ESL tag and the access point might be initially established, and subsequently re-established after synchronization has been lost, by the ESL tag advertising and/or connecting (or reconnecting) to the access point, and executing a Periodic Advertising Sync Transfer with Response (PAST-WR) procedure to receive timing information and a response access address (RspAA) over the BLE connection. However, this method of synchronizing over BLE connections using PAST-WR creates overhead both on the access point and on the ESL tags as the ESL tags need to connect to the access point to obtain synchronization information. In systems comprising a large number of ESL tags (e.g. thousands or tens of thousands of ESL tags), this can place a significant burden on the access point 102.

The disadvantages of this naïve approach are addressed by methods disclosed herein, which provide an improved approach for synchronization.

In some embodiments, this involves the transmission of initial configuration data to each ESL tag 104, 106 by the access point 102 before synchronization occurs, and then synchronizing the ESL tags 104, 106 using broadcast synchronization information, which can be received by any of the ESL tags 104, 106 at the same time, rather than by sending separate messages to individual ESL tags.

Figure 2:
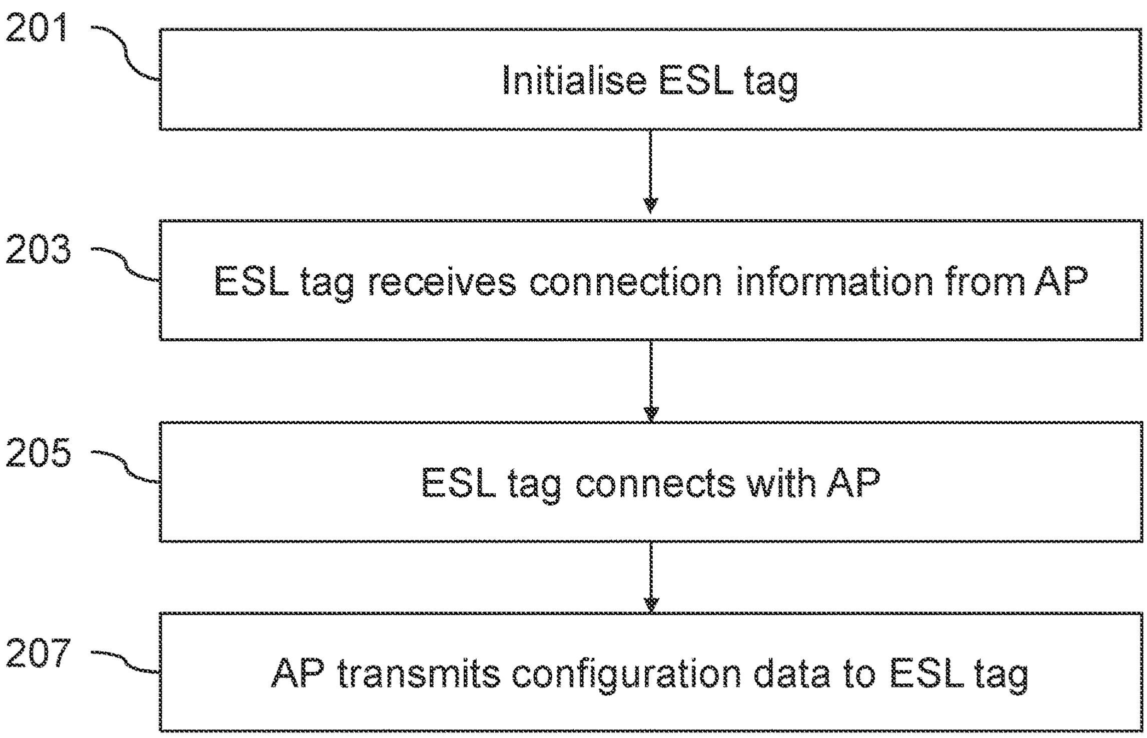
FIG. 2 is a flow diagram illustrating a method of configuring an ESL tag of the system for synchronizing with an access point.

FIG. 2 is a flow diagram illustrating a process for the initial configuring of an ESL tag 104, 106 by an access point 102, in preparation for receiving such broadcast synchronization information.

The ESL tags 104, 106 are both provided with configuration data which includes (but is not limited to) a first cryptographic key 115. The first cryptographic key 115 is a shared key that is also stored in the memory 114 of the access point 102 to which the ESL tags 104, 106 are to be synchronized.

The first cryptographic key 115 may be pre-loaded in advance to the ESL tags 104, 106 and the access point 102, or may be distributed to the ESL tags 104, 106 over a Bluetooth secure radio connection. It is used to encrypt messages sent by the access point 102 to the ESL tags 104, 106, and to decrypt the encrypted messages after they have been received. Using the shared first key 115, the security of information transmitted between the access point 102 and the ESL tags 104, 106 may be ensured, e.g. through authenticated encryption, and the ESL tags 104, 106 can also verify that the access point 102 from which the encrypted messages are received is indeed the access point 102 with which the ESL tags 104, 106 are intended to operate (i.e. it enables authentication).

In some embodiments, the ESL tags of the system, including tags 104, 106 and others, may be divided into a plurality of groups, with each group having its own cryptographic key, and each ESL tag in a given group sharing the same group-specific cryptographic key. In such embodiments, the access point 102 stores a plurality of cryptographic keys in its memory 114, for use with different groups of ESL tags.

These first cryptographic keys could be any symmetric keys, but in some embodiments they are 128-bit AES keys. Alternative embodiments could instead use asymmetric key-pairs. When, as in some embodiments, AES-CCM encryption is used, the access point 102 and ESL tags 104, 106 also share an initialisation vector (IV), and a correct key-IV pair is required for proper decryption and authentication.

The ESL tags 104, 106 are initially unconfigured. To operate with the access point 102, the ESL tags 104, 106 are mutually authenticated with the access point 102 to establish a Bluetooth secure connection, as will be described in the following.

To establish a connection between each of the ESL tags 104, 106 and the access point 102, the ESL tags 104, 106 advertise their presence in an initialisation step 201, e.g. by transmitting BLE advertising packets, and the access point 102 responds by transmitting tag-specific connection information to each ESL tag 104, 106 individually. The tag-specific connection information is received (step 203), after which each of the ESL tags 104, 106 establishes a BLE connection with the access point 102 (step 205).

Once the ESL tags 104, 106 are connected to the access point 102, the access point 102 transmits tag-specific configuration data individually to each of the ESL tags 104, 106 (step 207). The tag-specific configuration data includes a tag-specific response access address (RspAA) for the ESL tag 104, 106 to use when responding to subsequent messages from the access point 102. In embodiments in which the first cryptographic key 115 is not pre-loaded in advance to the ESL tags 104, 106, the tag-specific configuration data may also include the first cryptographic key 115. The configuration data also includes security material relating to the access point 102 and a time for the tag 104, 106 to sleep before first synchronizing with the access point. By providing the ESL tags 104, 106 with a time to sleep before the start of synchronization, the access point 102 can specify a time interval for the ESL tags 104, 106 to wait before attempting to synchronize with the access point 102, allowing the ESL tags to be in a low power state while the access point 102 is busy configuring other ESL tags 104, 106

After each ESL tag 104, 106 has been configured, it needs to be synchronized with the access point 102 to allow the tag 104, 106 to know when to wake to listen for Periodic Advertising with Responses (PAwR) messages from the access point 102. The use of shared timing information allows the ESL tags to enter a low-power sleep state, and to wake only when periodic advertising messages are due to be broadcast by the access point 102, thereby reducing power consumption of the ESL tags.

To achieve this, the access point 102 periodically broadcasts synchronization information that can be simultaneously received and used by every ESL tag that needs to be synchronized or resynchronized. In this way, the access point 102 can avoid having to send specific synchronization information to unsynchronized ESL tags on a one-to-one basis. To facilitate this approach, during configuration of ESL tags that are to be used with the access point 102, each of the ESL tags are provided with a unique response address that is retained even after synchronization with the access point 102 is lost.

The synchronization information in the train of periodic broadcast messages from the access point 102 is encrypted using a second cryptographic key (shown as 117 in FIG. 1), which is stored in common across some or all of the ESL tags 104, 106. This second key 117 is different to the first shared key 115 that is used for encryption of other messages. However, the second key 117 is mathematically derived from the first key 115, and is generated from the first key 115 by the access point 102 and each of the ESL tags 104, 106 executing a key derivation function.

Embodiments may use any appropriate key derivation function, but in some embodiments, the first key 115 is a 128-bit access-point sync key, AP_SYNC_KEY, that has an associated 64-bit access-point sync initialisation vector, AP_SYNC_IV, and the second key 117, AP_BROADCAST_ SYNC_KEY, and an associated initialisation vector, AP_BROADCAST_SYNC_IV, are derived from them as follows:

ZERO=16 octets of 0x00

SALT=AES-CMAC (Key=ZERO, Data="A_PREDEFINED_STRING")

T=AES-CMAC (Key=SALT, Data=AP_SYNC_KEY||AP_SYNC_IV)

T0=AES-CMAC (Key=T, Data=empty string)

AP_BROADCAST_SYNC_KEY=AES-CMAC (Key=T, Data=T0||0x01)

T2=AES-CMAC (Key=T, Data=AP_BROADCAST_SYNC_KEY||0x02)

AP_BROADCAST_SYNC_IV=T2 mod 2ˆ64

An advantage of encrypting the broadcast synchronization information with a second key 117 that is not the same as the first key 115 (even though it is derived from it), is that the messages sent by the AP 102 encrypted using the respective keys 115, 117 will be quite different from each other, even if the same nonce were to be used with both keys, and therefore the broadcast synchronization information will be more resistant to cryptoanalytic attacks by a malicious actor.

Figure 3:
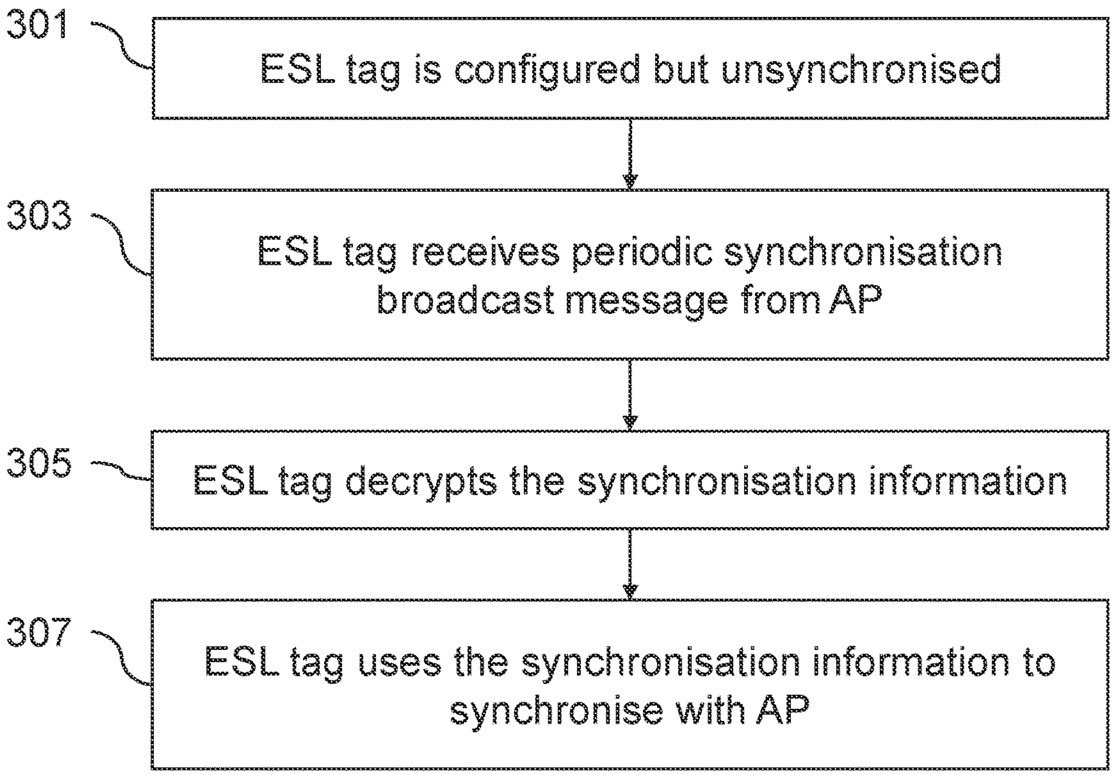
FIG. 3 is a flow diagram illustrating a method of synchronizing an ESL tag of the system using a broadcast message.

FIG. 3 shows the process of synchronizing an unsynchronized ESL tag 104. This could be its very first synchronization with the access point 102, or it could a be a resynchronization after the ESL tag has lost synchronization (e.g. due to a battery change, or after being out of the range of the access point 102 for too long).

Initially 301, the ESL tag has received configuration data, as described with reference to FIG. 2, but is not synchronized to the access point, e.g. for receiving Periodic Advertising with Responses (PAwR) messages.

Next 303, the ESL tag 104 listens for, and receives, one of the broadcast messages containing encrypted synchronization information, that are broadcast periodically from the access point 102.

The ESL tag 104 then decrypts and authenticates 305 the message using the second key 117 (which the ESL tag 104 has previously calculated from the first key 115 and stored in its memory 124). The ESL tag 104 then uses the synchronization information to synchronize with the access point 102, in step 307. The ESL tag 104 is subsequently able to communicate efficiently with the access point 102, e.g. using PAwR-based data exchange.

This synchronization process may be performed by any ESL tag 104, 106 that loses synchronization to the access point 102, and may be repeated at any time synchronization is lost, without requiring the tag 104, 106 to advertise or connect to the access point 102 for resynchronization. Thus, instead of having to re-synchronize each ESL tag 104, 106 that loses synchronization individually, the periodic broadcast of synchronization information by the access point 102 allows potentially multiple ESL tags to re-synchronize based on a single broadcast by the access point 102. This advantageously results in faster resynchronization of the ESL tags, with lower overheads and reduced power consumption for both the ESL tags 104, 106 and the access point 102.

These methods may be applied to systems comprising multiple distinct groups of ESL tags. To achieve this, the access point 102 may be configured to broadcast multiple trains of periodic synchronization advertising messages, each encrypted using a different group-specific second encryption key for receipt by a respective group of the ESL tags. The key for each group may generated from a common system-wide first key 115 using a different key derivation function specific to each group of ESL tags. Each ESL tag may be programmed with the key derivation function specific to its group, such that the tags of each group can only decrypt periodic synchronization advertising messages specific to that group. Alternatively, in other embodiments, all groups could be encrypted with same key and use same sync info.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments.

The invention claimed is:

1. A method of synchronizing a plurality of client devices with an access point device, wherein the client devices are Bluetooth Low Energy (BLE) electronic shelf label devices, and wherein the method comprises:

broadcasting by radio, from the access point device, a BLE advertising packet comprising encrypted synchronization information including information about the timing of one or more future BLE transmissions by the access point device;

receiving the BLE advertising packet at each of the plurality of client devices;

decrypting the encrypted synchronization information at each client device of the plurality of client devices; and using the synchronization information at each client device of the plurality of client devices to synchronize the respective client device with the access point device such that, once synchronized, each client device of the plurality of client devices enters a low-power sleep state when the one or more future BLE transmissions are not scheduled and wakes from the low-power sleep state when any of the one or more future BLE transmissions is due to be transmitted by the access point device.

2. The method of claim 1, comprising the same synchronization information in the BLE advertising packet being used by each client device of the plurality of client devices to synchronize the respective client device with the access point device.

3. The method of claim 1, further comprising each client device of the plurality of client devices generating a common second cryptographic key from a common first cryptographic key stored in a respective memory of the client device, and decrypting the encrypted synchronization information using the common second cryptographic key.

4. The method of claim 3, comprising each client device generating the common second cryptographic key from the common first cryptographic key using a key derivation function.

5. The method of claim 3, comprising at least one client device of the plurality of client devices using the common first cryptographic key to decrypt an encrypted message, received by the client device from the access point device, that is not a broadcast message comprising synchronization information for all of the plurality of client devices.

6. The method of claim 1, wherein the access point device is configured to broadcast synchronization information periodically in BLE advertising packets.

7. The method of claim 1, wherein the access point device is configured to communicate with the client devices using a Periodic Advertising with Responses (PAwR) protocol and wherein the one or more future BLE transmissions comprises one or more PAwR transmissions.

8. The method of claim 1, wherein the encrypted synchronization information is sent in the ACAD field of an AUX_ADV_IND BLE advertising packet broadcast by the access point device.

9. The method of claim 1, further comprising performing a respective initial configuration process for each client device, before the client device first synchronizes with the access point device, in which the client device receives respective configuration data from the access point device, by radio, wherein the respective configuration data includes a respective response address for the client device to include in one or more messages sent subsequently by the respective client device to the access point device.

10. The method of claim 1, further comprising performing a respective initial configuration process for each client device, before the client device first synchronizes with the access point device, in which the client device receives respective configuration data from the access point device, by radio, wherein the respective configuration data specifies a time interval for the client device to wait before synchronizing with the access point device.

11. The method of claim 1, wherein a set of client devices of the system are divided among a plurality of groups, and wherein said plurality of client devices are all in one group of the plurality of groups, the method further comprising the access point device broadcasting a plurality of BLE advertising packets, wherein each of the BLE advertising packets comprises respective encrypted synchronization information specific to a respective group of the plurality of groups.

12. The method of claim 11, wherein the encrypted synchronization information of each of the plurality of BLE advertising packets is encrypted using a different cryptographic key associated with a respective group of the plurality of groups.

13. An access point device comprising a radio transceiver, a processor and a memory, wherein the memory stores instructions that, when executed by the processor, cause the access point device to:

broadcast, by radio, a BLE advertising packet to a plurality of client devices, wherein the client devices are Bluetooth Low Energy (BLE) electronic shelf label devices, and wherein the BLE advertising packet comprises encrypted synchronization information about the timing of one or more future BLE transmissions by the access point device, such that each client device can enter a low-power sleep state when the one or more future BLE transmissions are not scheduled and can wake from the low-power sleep state when any of the one or more future BLE transmissions is due to be transmitted by the access point device; and receive data from one or more of the plurality of client devices by radio in response to a transmission by the access point device at a time determined at least in part by the synchronization information.

14. The access point device of claim 13, configured to broadcast the encrypted synchronization information in the ACAD field of an AUX_ADV_IND BLE advertising packet.

15. The access point device of claim 13, configured to broadcast a plurality of BLE advertising packets, wherein each of the BLE advertising packets comprises respective encrypted synchronization information specific to a respective group of a plurality of groups of client devices.

16. A client device comprising a radio transceiver, a processor, and a memory, wherein the client device is a Bluetooth Low Energy (BLE) electronic shelf label device and wherein the memory stores instructions that, when executed by the processor, cause the client device to:

receive by radio a BLE advertising packet broadcast from an access point device to a plurality of client devices, the BLE advertising packet comprising encrypted synchronization information including information about the timing of one or more future BLE transmissions by the access point;

decrypt the encrypted synchronization information; and use the synchronization information to synchronize with the access point device, such that, once synchronized, the client device enters a low-power sleep state when the one or more future BLE transmissions are not scheduled and wakes from the low-power sleep state when any of the one or more future BLE transmissions is due to be transmitted by the access point device.

17. The client device of claim 16, wherein the client device is configured to generate a second cryptographic key from a first cryptographic key stored in the memory of the client device, and to decrypt the encrypted synchronization information using the second cryptographic key.

* * * * *